Patented Jan. 26, 1954

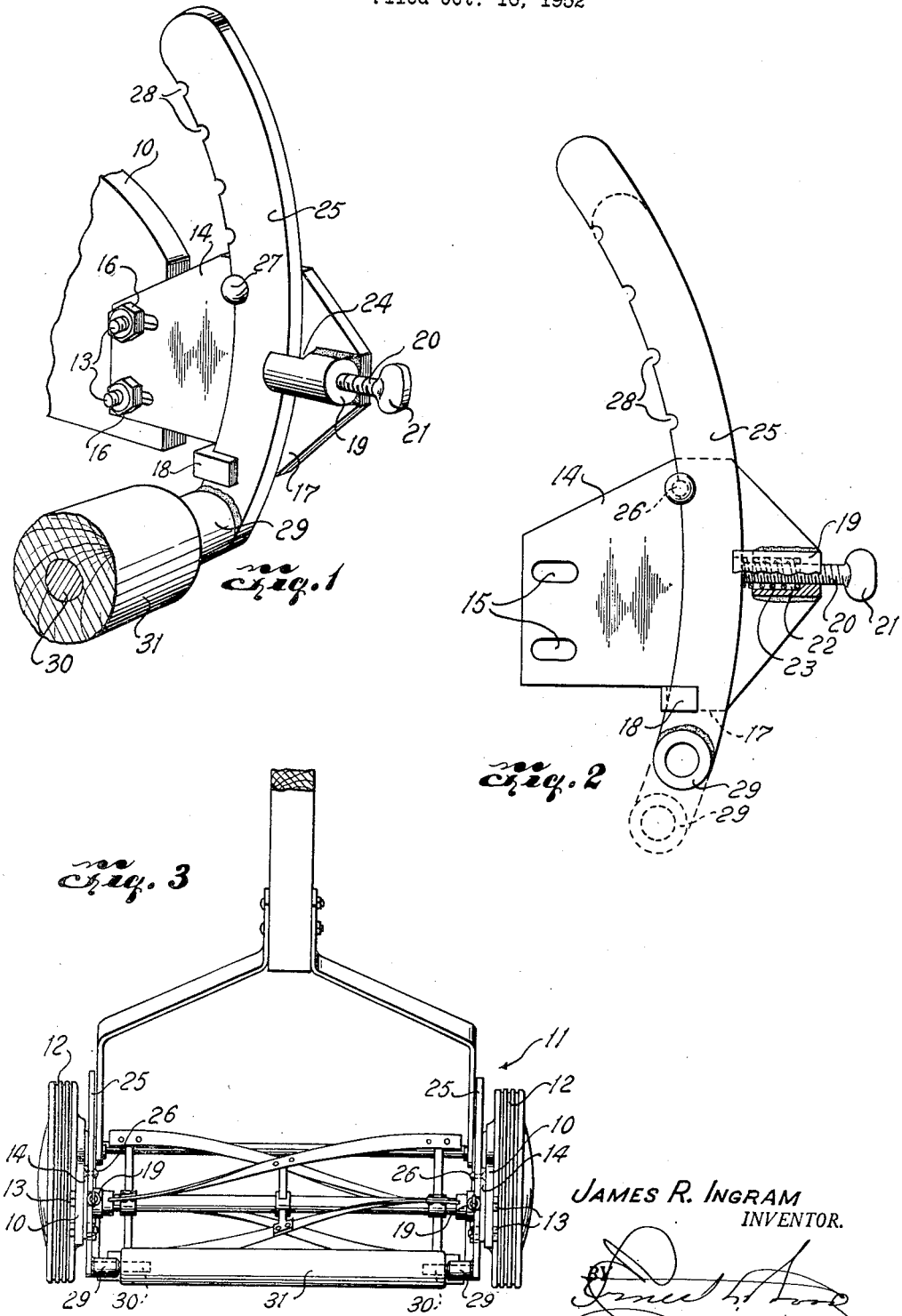

2,667,026

UNITED STATES PATENT OFFICE 2,667,026

ROLLER BRACKET FOR LAWN MOWERS

James R. Ingram, Dallas, Tex.

Application October 16, 1952, Serial No. 315,030

1 Claim. (Cl. 56—249)

This invention relates to lawn mower attachments and more particularly to a mounting for the cutter height adjusting roller for a lawn mower.

The principal object of the invention is to simplify the operation of raising and lowering the cutting elements of a lawn mower in relation to the ground engaging roller. This operation is conventionally required to be accomplished with the aid of tools while the present invention obviates the need for tools and further, it is possible, by virtue of certain novel features of construction to insure equal adjustment at each end of the lawn mower.

It is another object of the invention to provide a ground roller hanger or mounting which is attachable to virtually all makes of reel type lawn mowers and which may be quickly secured to the mower and, because of peculiar construction of the attachment, it may be at once determined if both ends of the roller are in equal adjustment, that is to say, in parallelism with the plane of the cutting elements.

With the foregoing and other objects in view, the invention has certain salient features of construction which will become manifest as the description proceeds taken in connection with the accompanying drawing wherein:

Figure 1 is a fragmentary perspective view of a lawn mower frame and ground engaging roller, showing the relationship of the present invention therewith.

Figure 2 is an elevational view showing the inner face of one of the roller hangers, and Figure 3 is a rear elevational view of a conventional lawn mower on which the invention is shown.

Continuing with a more detailed description of the drawing, reference numeral 10 denotes a portion of the frame of the lawn mower, indicated by the reference numeral 11 in Figure 3, the said frame portion 10 extending rearwardly of and in parallelism with the wheels 12 of lawn mower. Conventionally, the frame portions 10 each have a pair of vertically aligned bolts 13 mounted therein in confronting relationship. It is to these bolts that the invention is attached.

The invention consists of a pair of opposed mounting plates 14. Each of these plates has a pair of elongated apertures or slots 15 which are adapted to register with and receive the bolts 13 of the lawn mower frame 10. Nuts 16 are threaded onto the bolts 13 to secure the mounting plate 14 firmly in position. Each plate 14 is further provided with an extension 17 on its lower edge, a portion of which is slitted and turned upon itself to form a hook 18, the purpose of which will be presently described.

Welded or otherwise secured to each of the mounting plates 14 is a cylindrical boss 19 which is axially bored and threaded to receive a screw 20 having a wing nut 21 thereon. The boss 19 is also counterbored at 22 to provide an annular space about the screw 20 for the reception of a coil spring 23. A portion 24 of the boss 19 is cut away longitudinally to form a slot in which is slidably disposed the outer edge of an arcuate hanger arm 25. The hanger arm 25 is interposed between the end of the slot 24 of the boss 19 and a pin 26 anchored in the plate 14 and provided with a head 27 of greater diameter than the pin so that the concave edge of the hanger arm 25 will be held thereby against lateral displacement with respect to the plate 14. The pin 16 is adapted to be received selectively in the relatively spaced recesses 28 in the concave surface or edge of the hanger arm 25 as the same is moved longitudinally, which is permitted by the hook 18 on the lower edge of the plate 14, slot 24 of the boss 19 and the head 27 of the pin 26. In other words, the arm 25 is capable of free longitudinal movement except when the pin 26 engages one of the recesses 28 of the arm 25.

In order to yieldingly hold the arm 25 in a position so that the pin 26 will engage in a selected one of the recesses 28, the spring 22 within the box 19 normally biases the arm towards the pin 26. When the desired adjustment of the arm 25 has been attained, the wing nut 21 is rotated to move the screw 20 firmly against the convex edge of the arm 25 to positively hold the same against oscillative or longitudinal displacement.

Affixed to or formed on the lower end of the arm 25 is a bearing 29 in which is journaled an end of the shaft 30 of the ground roller 31.

It is evident from the foregoing that when it is desired to change the height of the cutting elements of the lawn mower in relation to the ground, it is necessary only to back out the screws 20 of the hangers at each end of the roller 31. This will release the hanger arms 25 for oscillative displacement. To raise the cutting elements, the pins 26 are moved to recesses 28 in higher positions in the arms 25 whereupon the screws 20 are again positioned against the arms 25 to prevent their movement from adjusted positions. Conversely, the cutting elements are lowered by correspondingly lowering the pins 26 in relation to the arms 25.

Manifestly, the construction as shown and described is capable of some modification and such modification as may be construed to fall within the scope and meaning of the appended claim is also considered to be within the spirit and intent of the invention.

What is claimed is:

In a lawn mower attachment, a ground roller mounting comprising a pair of complementary hangers, said hangers each comprising a mounting plate having horizontal, vertically spaced bolt receiving slots for the attachment of said plate to the frame of a lawn mower, a slotted boss affixed to said mounting plate having a threaded bore and a counterbore, a headed pin secured to one face of said mounting plate adjacent its top, an arcuate hanger arm having its outer edge slidable in the slot of said boss and provided in its inner edge with relatively spaced recesses adapted to selectively engage said pin, a hook on the bottom of said plate in which the inner edge of said hanger arm is slidably engaged, a coil spring in the counterbore of said boss bearing against said outer edge and thrusting said arm in the direction of said pin, a ground engaging roller having a shaft, a bearing on one end of said arm in which is journaled an end of said roller shaft and means threaded in the bore of said boss and extending through said coil spring for securing said arm against movement in said boss.

JAMES R. INGRAM.

References Cited in the file of this patent
UNITED STATES PATENTS

| Number | Name | Date |
|--------|------|------|
| 483,685 | Frisbie | Oct. 4, 1892 |
| 2,624,168 | Clemson | Jan. 6, 1953 |